United States Patent [19]

Blomberg et al.

[11] Patent Number: 4,933,031
[45] Date of Patent: Jun. 12, 1990

[54] HYDRAULIC CEMENT SLURRY

[75] Inventors: Nils Blomberg, Ålgård; Eldar O. Dingsoyr, Sogne; Per J. Svenkerud, Vågsbygd; Bjorn Vassoye, Stavanger, all of Norway

[73] Assignee: Elkem a/s and Den norske stats oljeselskap a.s., Norway

[21] Appl. No.: 98,751

[22] Filed: Sep. 17, 1987

Related U.S. Application Data

[63] Continuation of Ser. No. 818,185, Jan. 10, 1986, abandoned.

[30] Foreign Application Priority Data

Sep. 3, 1985 [NO] Norway .................. 853453

[51] Int. Cl.$^5$ .............. C04B 14/16; C04B 14/06; C04B 7/02
[52] U.S. Cl. ............... 106/679; 106/676; 106/681; 106/819; 106/672; 166/293
[58] Field of Search .............. 106/98, 314; 166/293

[56] References Cited

U.S. PATENT DOCUMENTS

| | | | |
|---|---|---|---|
| 3,131,075 | 4/1964 | Brooks, Jr. ............ | 106/90 |
| 3,844,351 | 10/1974 | Sutton et al. ........... | 166/293 |
| 4,148,781 | 4/1979 | Narukawa et al. ....... | 260/42.51 |
| 4,234,344 | 11/1980 | Tinsley et al. .......... | 106/88 |
| 4,252,193 | 2/1981 | Powers et al. .......... | 166/292 |
| 4,305,758 | 12/1981 | Powers et al. .......... | 106/97 |
| 4,385,935 | 5/1983 | Skjeldal .............. | 106/98 |
| 4,455,169 | 6/1984 | Chatterji et al. ........ | 106/93 |
| 4,501,830 | 2/1985 | Miller et al. ........... | 523/401 |
| 4,504,320 | 3/1985 | Rizer et al. ........... | 106/98 |
| 4,569,395 | 2/1986 | Carpenter ............ | 166/293 |

FOREIGN PATENT DOCUMENTS

| | | | |
|---|---|---|---|
| 80-00959 | 5/1980 | European Pat. Off. ..... | 106/98 |
| 7305235 | 10/1974 | Netherlands . | |
| 1496858 | 1/1978 | United Kingdom . | |
| 2131409 | 9/1986 | United Kingdom . | |

Primary Examiner—Mark L. Bell
Attorney, Agent, or Firm—Lucas & Just

[57] ABSTRACT

Hydraulic cement slurry for use in cementation of oil wells containing hydraulic cement, 5–100% microsilica based on the weight of cement, 2–200% light weight aggregate with a real particle density between 0.1 and 1.5 g/cm$^3$ based on the weight of the cement, 0–5% thinner (dry weight) based on the weight of the cement, 0–10% fluid loss additive (dry weight) based on the weight of the cement, and water in such an amount that the cement slurry has a density between 0.8 and 2.0 g/cm$^3$.

The cement slurry according to the present invention is gas tight and can thereby be used for cementation of oil well in fields having gas containing formations.

19 Claims, 2 Drawing Sheets

HYDRAULIC CEMENT SLURRY

This is a continuation of application Ser. No. 818,185, filed Jan. 10, 1986, now abandoned.

The present invention relates to a hydraulic cement slurry composition suitable for use in cementation of oil wells. The most significant features of the cement slurry of the present invention are that the cement slurry is gas tight and has a low density.

In cementation of oil wells a cement slurry is pumped down into a casing and back up the annular space between the outside of the casing and the wall of the well. The two most important purposes of the cementation process are to prevent transport of gas and liquid between subterranean formations and to tie up and support the casing pipe. In addition to seal oil,- gas- and water-producing formations, the cement also protects the casing against corrosion, prevents gas- or oil- blow-outs as the cement slurry very fast seales the well, protects the casing against shock-loads and seals of formation having lost-circulation.

In order to obtain a successfull cementation the hydraulic cement slurry has to satisfy a number of specific requirements. The rheology of the cement slurry has to be adjusted in order that the slurry may easily be pumped into the well. Further the cement slurry must effectively displace drilling mud in the annular space between the casing and the well. The cement slurry must have a low filtration loss in order to avoid loss of liquid from the cement slurry into the formation, as loss of liquid will increase the viscosity of the cement slurry. Finally, the cement slurry must have a smallest possible tendency of water separation.

The setting time of the cement slurry must be adjusted to ensure that the cement slurry does not set before the slurry is pumped into the well. The setting time which is needed will among other things depend on the depth of cementation and on the temperature in the well.

The density of the cement slurry is of great importance for the cementation process and for the results which are achieved.

For oil wells which are drilled through high pressure formations cement slurries having a high density is used in order to avoid uncontrolled blow-out during the cementation process. For oil wells which are drilled through low pressure formations where it is not advisable to expose the formations to high hydrostatic pressure, cement slurries having a low density have to be used, as a cement slurry having a too high density and thereby a high hydrostatic pressure may result in breakdown of the formation and loss of the cement slurry into the formation (lost circulation).

Another important property of the cement slurry is the early strength. The early strength is critical for how fast the drilling procedure can be restarted after the cementation process is finished.

Cements which have a compressive strength after 24 hours of at least 1.5 MPa are usually satisfactory. The development of the early strength of the cement slurry is very dependent on the temperature in the well.

For cement slurries which are used for cementation of high temperature wells it is further important that the cement slurries have a low strength retrogression.

For some oil wells the zones adjacent the cement containing annulus, contain gas under substantial pressure. This gas can cause serious problems during cementations of oil wells as the gas may penetrate through the cement slurry whereby an undesireable phenomenon referred to in the art as gas migration may occur.

Gas migration may start during setting of the cement slurry. Shortly after the cementation process is finished the cement slurry will change from a hydrostatic fluid to a solid state body. If the cement slurry in this critical phase is not able to resist the gas pressure, channels will be formed in the partial cured cement slurry. Gas under pressure will then flow through the column during the setting of the cement slurry and/or at the boundary between the cement slurry and the wall of the well. This may result in channels which can reach the top of the well.

Gas migration can increase if liquid is lost from the cement slurry and into the formations.

By gas migration there can also be a loss of production in that gas migrates from one formation into another formation and is thereby lost.

In order to produce cement slurries which have desired properties for use in cementation of oil wells, it is known to add a number of additives to the cement slurry in order to control the rheology of the cement slurry. Fluid loss additives can be added in order to reduce the loss of fluid from the cement slurry. Accelerators and retarders are used in order to control setting time and early strength.

In order to control gas migration it has been proposed to use fluid loss additives or a latex as for example a styrene/butadeine copolymer.

Gas migration is an especially difficult problem where a cement slurry having a very low density has to be used.

The oil fields named Gullfaks, Oseberg and Sleipner in the North Sea are examples where the formations are weak and contain gas. For cementation of oil wells situated on these fields it is therefore necessary to use cement slurries having a very low density and which is not gas permeable.

The hiertho known low density cement slurries for use in cementation of oil wells may be divided into three principally different groups:

1. Cement slurries having a high water/cement ratio with bentonite or water glass added as thickeners.

It is further known to replace bentonite and water glass by microsilica which are obtained from off-gases from furnaces for production of silicon or ferrosilicon. From the requirements to the early strength, cement slurries with a high water/cement ratio with bentonite added as a thickener can be used down to a density of approx. 1.6 $g/cm^3$, while cement slurries with a high water/cement ratio containing water glass and/or microsilica also can be used with densities between 1.4 and 1.6 $g/cm^3$.

2. Cement slurries containing light weight aggregates such as for example hollow microspheres. These slurries may from strength requirements be used with densities down to 1.1 $g/cm^3$. If the requirements to strength are reduced, even somewhat lower densities can be obtained.

3. Cement slurries containing entrained gas, (foamed cements) for example nitrogen or hydrogen, can be produced with densities down to approx. 1.0 $g/cm^3$.

If the cements in addition to the strength requirements also have to be gas impermeable it is not possible to use cement slurries of group 1 and group 2 having a lower density than 1.5 $g/m^3$. Foamed cements (group 3) can be produced with densities below 1.5 $g/cm^3$, but use of these kinds of cements for cementation of oil wells are, however, associated with a number of drawbacks and disadvantages. The entrained gas is more and more compressed as the hydrostatic pressure increases and, on the other hand, the entrained gas will expand as the cement slurry moves upwardly in the annulus between the casing and the wall of the well. Use of foamed cements therefore requires complicated and costly means for adjusting and controlling the gas content in the slurries and it is necessary to have an extensively control during the cementation process. By use of hydrogen there will in addition always exist a danger of explosion and comprehensive safety measures have to be undertaken in order to reduce this risk. Finally, the gas which is added to the cement slurry may contribute to development of channels in the cement slurry.

Accordingly, there exist a need for a cement slurry for use in cementation of oil wells having a low density, a required strength and which is gas tight and easy to produce and use.

By the present invention there is provided a hydraulic cement slurry which surprisingly satisfies the above mentioned requirements for cement slurries which are to be used in cementation of oil wells in gas containing, low pressure formations.

Accordingly, the present invention relates to a gas tight hydraulic cement slurry for use in cementation of oil wells where the hydraulic cement slurry contains a hydraulic cement, 5-100% microsilica based in the weight of cement, 2-200% of a particulate light weight aggregate having a real particle density between 0.1 and 1.5 g/cm$^3$ based on the weight of cement, 0-5% of a thinner (dry weight) based on the weight of the cement, 0-10% fluid loss additive (dry weight) based on the weight of cement and water in such an amount that the cement slurry have a density between 0.8 and 2.0 g/cm$^3$.

Figure 1:
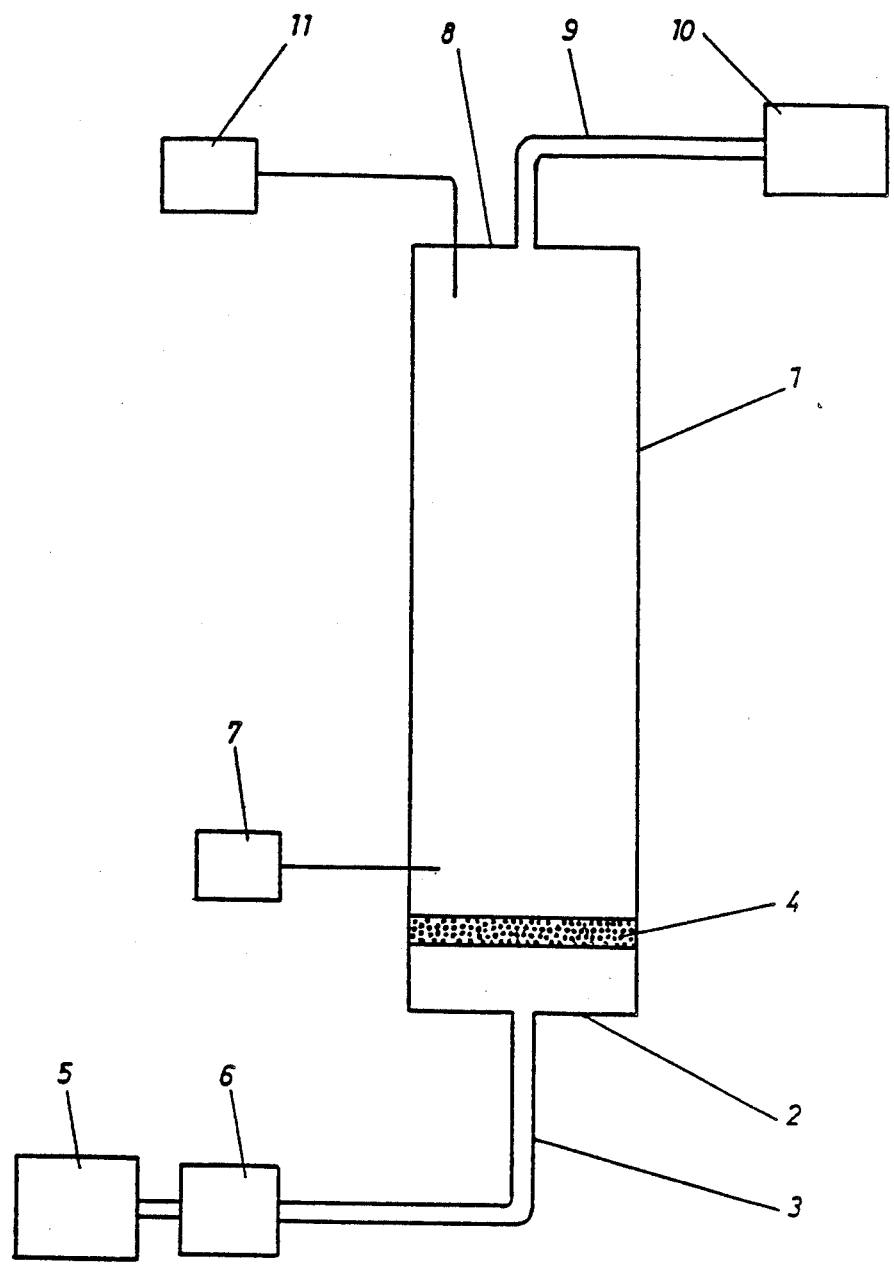
FIG. 1 illustrates test apparatus for testing gas migration in accordance with the present invention.

Any ordinary hudraulic cement can be used, such as for example Portland cement, but preferably cements for oil well cementation specified by API are used.

The microsilica used in the hydraulic cement slurry is preferably silica dust collected from off-gases from electrothermal smelting furnaces for production of silicon or ferrosilicon containing at least 75% by weight of silicon, but silica dust from furnaces producing 50% ferrosilicon may also be used.

By adjusting the operation parameters, it is also possible to produce silica dust as the main product from the above mentioned furnaces. Amorpheous silica of this kind can also be produced syntethically without reduction and reoxidation. Alternatively a silica generator can be used for producing finily divided silica or silica can be produced by precipitation.

The amorpheous silica dust which are used in the hydraulic cement slurry of the present invention consists to a very high extent of submicron, spherical particles.

The silica dust particles may contain 60-100% by weight of $SiO_2$, have a real particle density between 2.00 and 2.40 g/cm$^3$ and a specific area of 15-30 m$^2$. The individual particles are mainly spherical and have a diameter below 1 µm. Variation in these values are of course possible. The silica dust may for example have a lower $SiO_2$-content and the particle size distribution may be adjusted by removing course particles.

In order to obtain a most gas tight cement slurry, the hydraulic cement slurry preferably contains 10-70% microsilica based on the weight of cement.

Cement slurries containing 15-50% microsilica based on the weight of the cement are especially preferred.

The hydraulic cement slurry according to the present inventions preferably contains 10-100% light weight particulate aggregate based on the weight of the cement.

As light weight particulate aggregate it is preferred to use hollow spheres produced from fly ash. This kind of light weight aggregate is sold under a number of trade names such as for example Fillite delivered by Fillite Ltd., England.

Even if hollow spheres produced from fly ash are preferred, a number of other kinds of light weight aggregates which satisfy the necessary requirements can be used. Examples are hollow spheres made from glass, hollow spheres made from alumina, expanded clay etc.

The hydraulic cement slurry according to the present invention preferably contains a thinner in an amount of 0.1 to 2% (dry weight) based on the weight of the cement. As thinners additives which are known as plastisizers or superplastisizers in cement based systems can be used. These are well-known additives which may be based on lignosulfonate, polyhydroxy carboxylic acid, sulfonated naphtaleneformaldehyde or sulfonated melamineformaldehyde products.

The hydraulic cement slurry according to the present invention preferably contains 0.1-5% (dry weight) of a fluid loss additive based on the weight of the cement. As fluid loss additive known additives as for example additives based on starch or derivates of starch, derivates of cellulose such as carboxymetylcellulose, methylcellulose or etylcellulose or synthetic polymers such as polyacrylonitril or polyacrylamide may be used.

Both fresh water and sea water may be used in the hydraulic cement slurry of the present invention.

If necessary, accelerators or retarders may be incorporated into the cement slurry in order to adjust the setting time.

The present invention will now be further illustrated by the following examples.

EXAMPLE 1

A hydraulic cement slurry according to the present invention having the following composition was produced:

| Cement slurry A: | |
|---|---|
| G-cement | 100.0 kg |
| Microsilica in the form of EMSAC 465T | 15.0 kg |
| Light weight aggregate; Fillite 0,7 | 4.0 kg |
| Sea water | 95.0 kg |
| Accelerator (Pozzolith 500A) | 0.6 l |
| Theoretical density for cement slurry A is | 1.55 g/cm$^3$. |

G-cement is a Portland cement delivered by Norcem A/S, Norway. EMSAC 465T is a microsilica with highly controlled quality which are produced and sold by Elkem a/s, Chemicals, Norway. Pozzolith 500 A is a curing accelerator which are delivered by Master Builders, USA and Fillite 0,7 is a light weight aggregate in form of hollow spheres having a real particle density of about 0,6 g/cm³ and is delivered by Fillite Ltd., England.

In order to compare the properties of cement slurry A with a known cement slurry for use in cementation of oil wells another cement slurry B was produced. The composition of cement slurry B was:

| Cement slurry B: | |
|---|---|
| G-cement | 100.0 kg |
| Water glass (35% by weight dry material) | 4.0 l |
| Sea water | 97.7 kg |
| Theoretical density for cement slurry B is | 1.55 g/cm³. |

Cement slurries A and B were mixed and tested according to API specification 10.

The results are given in Table I.

TABLE 1

| | CEMENT SLURRY | |
|---|---|---|
| | A | B |
| Density, g/cm³ | 1.53 | 1.53 |
| Apparent viscosity, cp | 24 | 20 |
| Plastic viscosity, cp | 18 | 16 |
| Yield point lb/100 ft² | 12 | 7 |
| Free water, volume % | 0 | 0,5 |
| Setting time: | | |
| Consistency 30B C | 3 h 15 min. | 3 h 20 min. |
| 100B C | 5 h 30 min. | 5 h 20 min. |
| Compressive strength after 24 hours at 30° C. | 4.0 MPa | 3.0 MPa |

It will be evident from the results given in Table I that cement slurry A according to the present invention has substantially the same values as cement slurry B and accordingly the cement slurry A of the present inventions satifies the requirements which normally is set for a cement slurry for use in cementations of oil wells.

The cement slurries A and B were also tested in a gas migration apparatus. The test was run in the apparatus shown at FIG. 1. The apparatus comprises an acrylic pipe. The pipe is 2.0 m high and has an inner diameter of 80 mm and a wall thickness of 5 mm. In the bottom of the pipe 1 at bottom plate 2 is secured. In the bottom plate 2 it is inserted a pipe 3 for supply of air. Just above the bottom plate 2 there is placed a permeable sand filter 4 made from a mix of sand of uniform particle size and epoxy. Air is supplied to the bottom of the pipe 1 by a compressor 5 and the air pressure is controlled by a regulator 6. Means 7 for measuring the hydrostatic pressure is inserted into the pipe 1. A cover plate 8 is secured to the top of the pipe 1. The cover plate 8 has an opening for insertion of a pipe 9 which is connected to a gas flow measurement unit 10. To the pipe 1 there is also connected a temperature measuring device 11.

Figure 2:
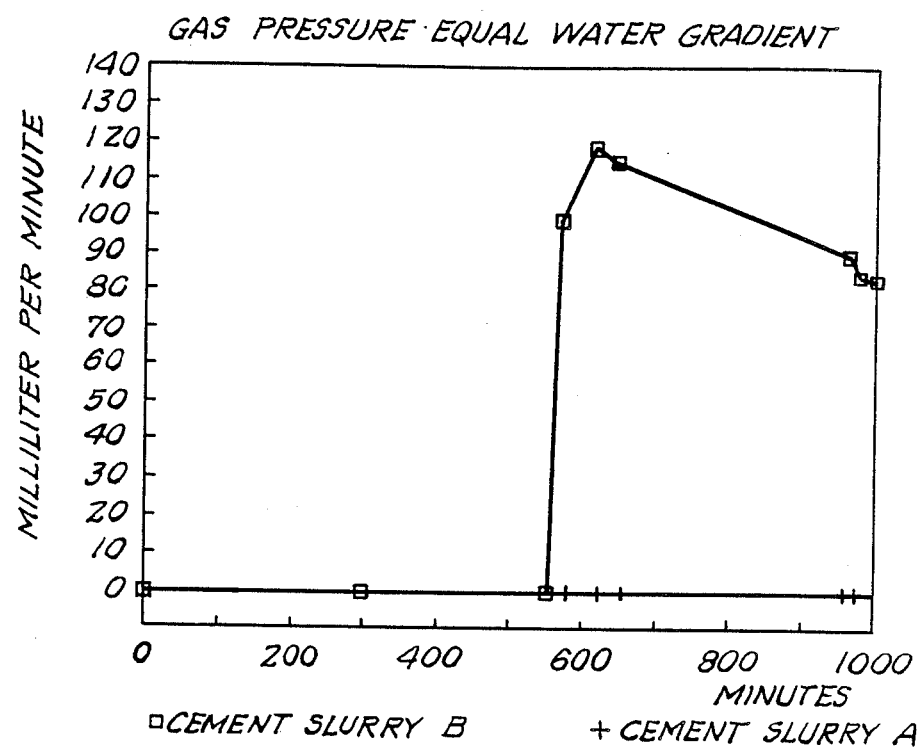
FIG. 2 illustrates the gas migration test on cement slurries A and B.

The result of the gas migration tests for cement slurries A and B are shown on FIG. 2 which shows the measured gas flow through the cement slurries in ml/min as a function of time. From FIG. 2 it is seen that the cement slurry A according to the present invention is gas-tight, as no gas flow was measured through a column of cement slurry placed inside the pipe 1.

FIG. 2 also shows that the cement slurry B according to the state of art exhibited a strong gas migration. The cement slurry B can thus not be used for cementation of oil wells if the formations contain gas.

EXAMPLE 2

Three cement slurries C, D and E were produced. Cement slurry D and E have compositions according to the present invention while cement slurry C has a composition according to the known state of art.

The compositions of cement slurries C, D and E are as follows:

| CEMENT SLURRY C | |
|---|---|
| G-cement | 100.0 kg |
| Light weight aggregate (Fillite 0,7) | 38.0 kg |
| Fluid Loss additive, D19 (dry weight) | 1.5 kg |
| Thinner, D 31 (dry weight) | 0.4 kg |
| Water glass (35% solution) | 1.36 kg |
| Sea water | 87.8 kg |
| Theoretical density | 1.25 g/cm³ |

| CEMENT SLURRY D | |
|---|---|
| G-cement | 100.0 kg |
| EMSAC 465 T | 25.0 kg |
| Light weight aggregate (Fillite 0,7) | 43.5 kg |
| Thinner, D 31 (dry weight) | 1.7 kg |
| Fluid Loss additive, D19 (dry weight) | 1.5 kg |
| Accelerator (water glass, 35% solution) | 0.68 kg |
| Sea water | 109.0 kg |
| Theoretical density | 1.25 g/cm³ |

| CEMENT SLURRY E | |
|---|---|
| G-cement | 100.0 kg |
| EMSAC 465 T | 40.0 kg |
| Light weight aggregate, Fillite 0,4 | 40.1 kg |
| Thinner, D 31 (dry weight) | 2.9 kg |
| Fluid Loss additive, D 19, (dry weight) | 1.5 kg |
| Sea water | 110.0 kg |
| Theoretical density | 1.10 g/cm³ |

D 31 and D 19 are respectively a thinner and a fluid loss additive delivered by B. J. Hughes, USA.

The cement slurries C, D and E were mixed and tested in accordance with the procedure of example 1.

The results are given in Table II.

TABLE II

| | CEMENT SLURRY | | |
|---|---|---|---|
| | C | D | E |
| Density, g/cm³ | 1.26 | 1.24 | 1.09 |
| Apparent viscosity, cp | 110 | 53 | 55 |
| Plastic viscosity, cp | 100 | 45 | 45 |
| Yield point, lb/100 ft² | 20 | 15 | 20 |
| Free water, volume % | 0.5 | 0 | 0 |
| Fluid loss (ml) (100 psi, 20° C.) | 20 | 9 | 9 |
| Setting time (20° C.) | 16 hours | 16 hours | 20 hours |
| Compressive strength after 24 hours at 30° C., MPa | 3.0 | 3.5 | 2.5 |

The cement slurries C, D and E were further tested on gas migration. The same apparatus as described in example 1 was used.

Figure 3:
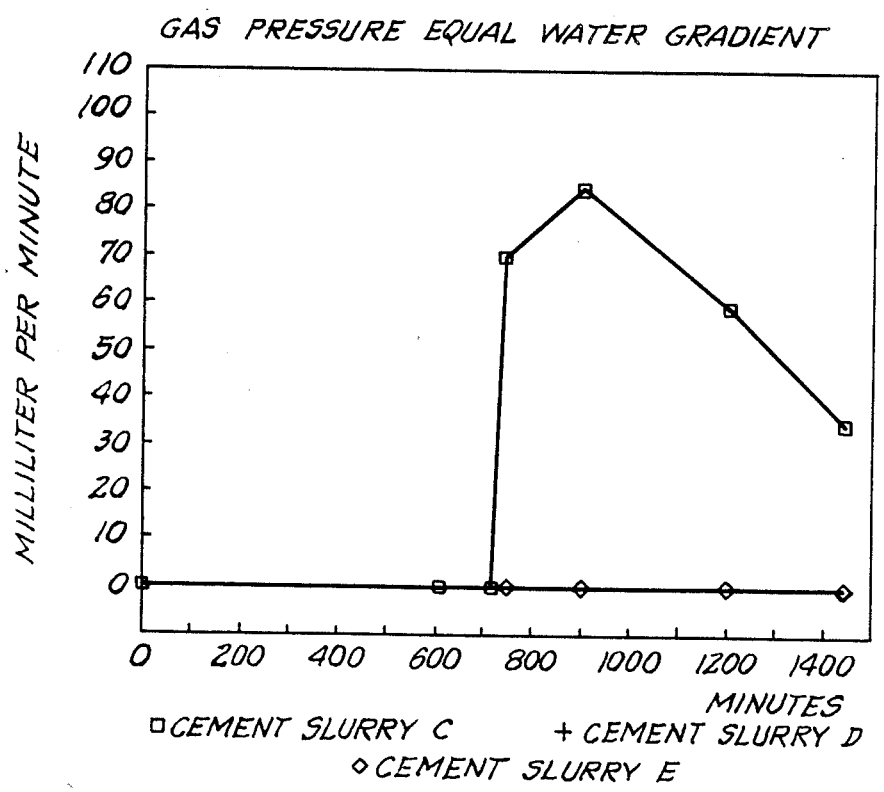
FIG. 3 illustrates the gas migration test on cement slurries C, D and E.

The results fron the gas migration tests are shown in FIG. 3 which shows measured gas flow in ml/min through the cement slurries as a function of time.

It is clearly seen from FIG. 3 that the cement slurries D and E according to the present invention are gas tight, while for the cement slurry C according to the known state of art a strong flow of gas appears after about 660 minutes.

EXAMPLE 3

Six cement slurries F–K according to the present invention were produced. The cement slurries contain varying amounts and types of light weight aggregate. The compositions of the cement slurries F–K are shown in Table III.

TABLE III

| Cement slurry | F kg | G kg | H kg | I kg | J kg | K kg |
|---|---|---|---|---|---|---|
| G-cement | 100 | 100 | 100 | 100 | 100 | 100 |
| EMSAC 465 T | 40 | 40 | 25 | 40 | 40 | 15 |
| Fluid loss additive (D 19) | 1.5 | 1.5 | 1.5 | 1.5 | 1.5 | 1.5 |
| Thinner (D-31) | 1.5 | 2.5 | 1.0 | 0.9 | 0.7 | 3.3 |
| Light weight aggregate | | | | | | |
| Hollow spheres of flyash (Fillite 0,7) | 93.0 | | | | | |
| Hollow glass spheres (Armospheres) | | 136.3 | | | | |
| Hollow spheres of alumina (Rhinalox Kugelkorund) | | | 125.0 | | | |
| Hollow spheres of natriumboron silicate (Eccospheres IG - 101) | | | | 34.8 | | |
| Hollow epoxyspheres (Eccospheres EP-300) | | | | | 29.2 | |
| Expanded clay (Liapor-sand L) | | | | | | 160 |
| Sea water | 110 | 110 | 110 | 110 | 110 | 110 |

Theoretical density of cement slurries F, G, I, and J is 1.10 g/cm$^3$. Cement slurry H as a theoretical density of 1.25 g/cm$^3$ and cement slurry K 1.45 g/cm$^3$.

The light weight aggregates which are not mentioned earlier are:
- Armospheres delivered by A. M. L. International, England.
- Rhinalox Kugelrund delivered by Hermann C. Stark, West-Germany.
- Eccospheres delivered by Emerson & Cuming Inc., USA
- Liaporsand delivered by Liapor, West Germany The cement slurries F–K were mixed and tested in accordance with the procedure given in example 1. The results are given in Table IV.

TABLE IV

| | Cement slurry | | | | | |
|---|---|---|---|---|---|---|
| | F | G | H | I | J | K |
| Density, g/cm$^3$ | 1.09 | 1.08 | 1.26 | 1.10 | 1.11 | 1.48 |
| Apparent viscosity, cp | 153 | 60 | 55 | 53 | 51 | 160 |
| Plastic viscosity, cp | 146 | 54 | 50 | 46 | 44 | 150 |
| Yield point lb/100 ft$^2$ | 14 | 12 | 10 | 14 | 14 | 20 |
| Compressive strength after 24 hours at 30° C., MPA | 2.0 | 1.1 | 2.5 | 2.4 | 2.7 | 3.8 |

The cement slurries F–K were tested for gas migration in the apparatus described in example 1. No flow of gas could be measured.

EXAMPLE 4

A cement slurry L in accordance with the present invention was produced. The cement slurry had a high content of microsilica and fresh water was used instead of sea water. The composition of cement slurry C was as follows:

| CEMENT SLURRY L | |
|---|---|
| G-cement | 100.0 kg |
| Light weight aggregate | |
| Fillite 0,7 | 53.0 kg |
| EMSAC 465 T | 80.0 kg |
| Thinner, D-31 (dry weight) | 2.9 kg |
| Fresh water | 123.5 kg |
| Theoretical density | 1.25 g/cm$^3$ |

Cement slurry L was tested in accordance with the procedure described in Example 1. The results are shown in table V.

TABLE V

| Density, g/cm$^3$ | 1.28 |
|---|---|
| Apparent viscosity, cp | 48 |
| Plastic viscosity, cp | 42 |
| Yield point, lb/100 ft$^2$ | 12 |
| Compressive strength after 24 hours at 20° C., MPa | 1.0 |

No gas flow was measured when the cement slurry L was tested in the gas migration apparatus described in Example 1.

What is claimed:

1. A gas tight oil and gas well hydraulic cement slurry consists essentially of a hydraulic cement, 5–100% microsilica based on the weight of cement, 2–100% hollow sphere, light weight aggregate with a real particle density between 0.1 and 1.5 g/cm$^3$ based on the weight of cement, 0–5% of a thinner (dry weight) based on the weight of cement, 0–10% of a fluid loss additive (dry weight) based on the weight of cement and water in such an amount that the cement slurry has a density between 0.8 and 2.0 g/cm$^3$ and a weight ratio of water to cement plus microsilica of about 0.69 to about 0.96 thereby forming a gas tight cement slurry.

2. Hydraulic cement slurry according to claim 1, characterized in that the cement slurry contains 10–70%, microsilica based on the weight of the cement.

3. Hydraulic cement slurry according to claim 1, characterized in that the cement slurry contains 10–100% light weight aggregate based on the weight of the cement.

4. Hydraulic cement slurry according to claim 1, characterized in that the cement slurry contains water in such an amount that the cement slurry has a density between 1.0 and 1.5 g/cm$^3$.

5. Hydraulic cement slurry according to claim 1, characterized in that the cement slurry contains 0.1–2% thinner (dry weight) based on the weight of cement.

6. Hydraulic cement slurry according to claim 1, characterized in that the cement slurry contains 0,1–5% of a fluid loss additive (dry weight) based on the weight of the cement.

7. Hydraulic cement slurry according to claim 1, characterized in that the cement slurry contains a curing accelerator.

8. Hydraulic cement slurry according to claim 1, characterized in that the cement slurry contains a curing retarder.

9. Hydraulic cement slurry according to claim 1 characterized in that the cement slurry contains about 15–50% microsilica based on the weight of cement.

10. Hydraulic cement slurry according to claim 2 characterized in that the cement slurry contains about 10-100% light weight aggregate based on the weight of cement.

11. Hydraulic cement slurry according to claim 9 characterized in that the cement slurry contains about 10-100% light weight aggregate based on the weight of cement.

12. Hydraulic cement slurry according to claim 5 characterized in that the cement slurry contains about 10-70% microsilica based on the weight of cement, about 10-100% light weight aggregate based on the weight of cement and the cement slurry contains water in such an amount that the cement slurry has a density between about 1.0 and 1.5 g/cm$^3$.

13. Hydraulic cement slurry according to claim 6 characterized in that the cement slurry contains about 10-70% microsilica based on the weight of cement, about 10-100% light weight aggregate based on the weight of cement and the cement slurry contains water in such an amount that the cement slurry has a density between about 1.0 and 1.5 g/cm$^3$.

14. Hydraulic cement slurry according to claim 7 characterized in that the cement slurry contains about 10-70% microsilica based on the weight of cement, about 10-100% light weight aggregate based on the weight of cement, about 0.1-2% thinner (dry weight) based on the weight of cement, about 0.1-5% of a fluid loss additive (dry weight) based on the weight of cement and the cement slurry contains water in such an amount that the cement slurry has a density between about 1.0 and 1.5 g/cm$^3$.

15. Hydraulic cement slurry according to claim 8 characterized in that the cement slurry contains about 10-70% microsilica based on the weight of cement, about 10-100% light weight aggregate, about 0.1-2% thinner (dry weight) based on the weight of cement, about 0.1-5% of a fluid loss additive based on the weight of cement and the cement slurry contains water in such an amount that the cement slurry has a density between about 1.0 and 1.5 g/cm$^3$.

16. Hydraulic cement slurry according to claim 14 characterized in that the hollow microspheres are produced from flyash.

17. Hydraulic cement slurry according to claim 15 characterized in that the hollow microspheres are produced from flyash.

18. The improved method of cementing the annulus between the casing and the wall of an oil and gas well with a low-density pumpable gas tight slurry of cement comprising the steps of:
  (a) mixing a gas tight hydraulic cement slurry which consists of a hydraulic cement, 5-100% microsilica based on the weight of cement, 2-200% hollow sphere, light weight aggregate with a real particle density between 0.1 and 1.5 g/cm$^3$ based on the weight of cement, 0-5% of a thinner (dry weight) based on the weight of cement, 0-10% of a fluid loss additive (dry weight) based on the weight of cement and water in such an amount that the cement slurry has a density between 0.8 and 2.0 g/cm$^3$ and a weight ratio of water to cement plus microsilica of about 0.69 to about 0.96; and
  (b) pumping said hydraulic cement slurry into the annulus between the casing and the wall of the well.

19. The hydraulic cement slurry of claim 1 having a weight ratio of water to cement plus microsilica of about 0.78 to about 0.96.

* * * * *